(12) United States Patent
Kim

(10) Patent No.: US 7,466,386 B2
(45) Date of Patent: Dec. 16, 2008

(54) MULTI-DOMAIN LIQUID CRYSTAL DISPLAY DEVICE AND MANUFACTURING METHOD THEREOF

(75) Inventor: Jung Hyun Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 302 days.

(21) Appl. No.: 11/167,190

(22) Filed: Jun. 28, 2005

(65) Prior Publication Data

US 2006/0146259 A1    Jul. 6, 2006

(30) Foreign Application Priority Data

Dec. 31, 2004    (KR) .................. 10-2004-0118379

(51) Int. Cl.
*G02F 1/1343*    (2006.01)
(52) U.S. Cl. .................. 349/143; 349/129; 349/130; 349/144; 349/145; 349/146
(58) Field of Classification Search .................. 349/29, 349/139–152, 130
See application file for complete search history.

(56) References Cited

U.S. PATENT DOCUMENTS

| | | | |
|---|---|---|---|
| 2003/0128312 A1* | 7/2003 | Lu et al. ...................... | 349/110 |
| 2004/0227894 A1* | 11/2004 | Kim et al. ................... | 349/145 |
| 2005/0007529 A1* | 1/2005 | Kim et al. ................... | 349/129 |
| 2005/0094082 A1* | 5/2005 | Kim et al. ................... | 349/145 |
| 2005/0128415 A1* | 6/2005 | Kwon et al. ................. | 349/145 |

* cited by examiner

*Primary Examiner*—Andrew Schechter
*Assistant Examiner*—Jessica M Merlin
(74) *Attorney, Agent, or Firm*—McKenna Long & Aldridge LLP

(57) ABSTRACT

A liquid crystal display device (LCD) is provided. The LCD includes first and second substrates; a plurality of gate lines on the first substrate; a plurality of data lines crossing the gate lines to define a plurality of pixel regions; a thin film transistor at a crossing intersection of the gate line and the data line; a pixel electrode in the pixel region, the pixel electrode having a zigzag slit pattern formed therein, the slit pattern dividing the pixel electrode into at least two domains; a dielectric protrusion on the second substrate; and a liquid crystal layer between the first and second substrates.

23 Claims, 6 Drawing Sheets

MULTI-DOMAIN LIQUID CRYSTAL DISPLAY DEVICE AND MANUFACTURING METHOD THEREOF

This application claims the benefit of Korean Patent Application No. 2004-118378, filed on Dec. 31, 2004, which is hereby incorporated by reference for all purposes as if fully set forth herein.

BACKGROUND OF THE INVENTION

The present invention relates to a liquid crystal display device (LCD), and more particularly, to a vertical alignment mode multi-domain LCD capable of providing a high image quality and a manufacturing method thereof.

DESCRIPTION OF THE RELATED ART

A liquid crystal display device (LCD) includes two substrates, a liquid crystal layer interposed between the two substrates, electrodes formed on inner surfaces of the two substrates, and polarizers attached on outer surfaces of the two substrates. When a voltage is applied to the electrodes, the LCD transmits or blocks light by adjusting an alignment of liquid crystal molecules according to the relationship between the liquid crystal and the polarizer, thereby displaying an image.

Recently, an active matrix type (AM) thin film transistor (TFT) LCD has been developed. The AM TFT LCD adjusts each pixel electrode using a transistor.

A vertical alignment mode LCD uses a negative-type liquid crystal with a negative dielectric anisotropy. The negative-type liquid crystal has a property where a major axis of its molecules are arranged perpendicular to an alignment layer when no voltage is applied thereto and are arranged at a slight angle to the alignment layer when a voltage is applied thereto. By using such a property of the negative-type liquid crystal, the vertical alignment mode LCD adjusts the light transmittance of the liquid crystal to thereby display an image.

Meanwhile, in order to obtain a wide viewing angle, the vertical alignment mode LCD uses an alignment technique such as a patterned vertical alignment (PVA) or a multi-domain vertical alignment (MVA) that aligns liquid crystal molecules in a desired direction by distorting an electric field applied to a liquid crystal layer through an auxiliary electrode, a rib or a slit formed on a substrate.

FIG. 1A is a plan view of a unit pixel of a related art LCD, and FIG. 1B is a sectional view taken along line A-A' in FIG. 1A.

In FIGS. 1A and 1B, the related art LCD includes first and second substrates 1 and 2 facing each other, and gate and data lines 7 and 9 formed substantially perpendicular to each other on the first substrate 1 to thereby define a pixel region.

On the first substrate 1, a pixel electrode 13 with an electric field induction window 14 is formed in the defined pixel region and a common auxiliary electrode 11 is formed on the same layer as the gate line 7 so as to overlap with the periphery of the pixel electrode 13.

A gate insulating layer 3 is formed on the gate line 7, and a passivation layer 5 is formed on the data line 9.

A black matrix layer 4 is formed on the second substrate 2, and a color filter layer 6 is formed on the black matrix layer 4. A common electrode 8 is formed on the color filter layer 6 and a dielectric structure 10 is formed on the common electrode 8.

A liquid crystal layer (not shown) is formed between the first and second substrates 1 and 2.

The electric field induction window 14, the common auxiliary electrode 11 and the dielectric structure 10 in the related art LCD distorts an electric field applied to the liquid crystal layer.

The distorted electric field causes the liquid crystal to be arranged in a desired direction, thereby driving liquid crystal molecules in a unit pixel and resulting in a multi-domain effect.

However, because a domain of the related art LCD has a rectangular shape, the distances between the edges of the domain and the dielectric structure vary from one another.

This structure causes an asymmetric electric field to occur, thereby making it difficult to obtain a stable picture texture.

SUMMARY OF THE INVENTION

Accordingly, the present invention is directed to a multi-domain liquid crystal display device and manufacturing method thereof that substantially obviates one or more of the problems due to limitations and disadvantages of the related art.

An advantage of the present invention is to provide a vertical alignment mode multi-domain LCD and a manufacturing method thereof, which can provide a stable picture texture, a wide viewing angle and a high aperture ratio through an effective distortion of an electric field by changing the structure of the data line, a pixel electrode, and a dielectric structure of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device (LCD) including: first and second substrates; a plurality of gate lines on the first substrate; a plurality of data lines crossing the gate lines to define a plurality of pixel regions; a thin film transistor at a crossing intersection of the gate line and the data line; a pixel electrode in the pixel region, the pixel electrode having a zigzag slit pattern formed therein, the slit pattern dividing the pixel electrode into at least two domains; a dielectric protrusion on the second substrate; and a liquid crystal layer between the first and second substrates.

In another aspect of the present invention, an LCD (liquid crystal display device) including: first and second substrates; a plurality of gate lines on the first substrate; a plurality of zigzag data lines crossing the gate lines to define a plurality of pixel regions; a thin film transistor at a crossing of the gate line and the data line; a pixel electrode in the pixel region, the pixel electrode having a zigzag edge and a zigzag slit pattern formed therein, the slit pattern dividing the pixel electrode into at least two domains; a zigzag dielectric protrusion on the second substrate; and a liquid crystal layer between the first and second substrates.

In another aspect of the present invention, a method for manufacturing a liquid crystal display device (LCD), the method comprising: providing first and second substrates; forming a gate line on the first substrate; forming a data line crossing the gate line with an insulating layer therebetween to define a pixel region; forming a pixel electrode in the pixel region with a slit having a zigzag pattern, the pixel electrode being divided by the slit into a plurality of domains; forming a dielectric protrusion on the second substrate corresponding to the domains, the dielectric protrusion being parallel to the zigzag slit pattern; and forming a liquid crystal layer between the first and second substrates.

In another aspect of the present invention, a method for manufacturing a liquid crystal display device (LCD), the method comprising: providing first and second substrates; forming a gate line on the first substrate; forming a data line crossing the gate line with an insulating layer therebetween to define a pixel region; forming a pixel electrode in the pixel region with a slit having a zigzag pattern, the pixel electrode being divided by the slit into a plurality of domains; forming a dielectric protrusion on the second substrate corresponding to the domains, the dielectric protrusion being parallel to the zigzag slit pattern; and forming a liquid crystal layer between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to an embodiment of the present invention, example of which is illustrated in the accompanying drawings. Wherever possible, the same reference numbers will be used throughout the drawings to refer to the same or like parts.

Figure 1A:
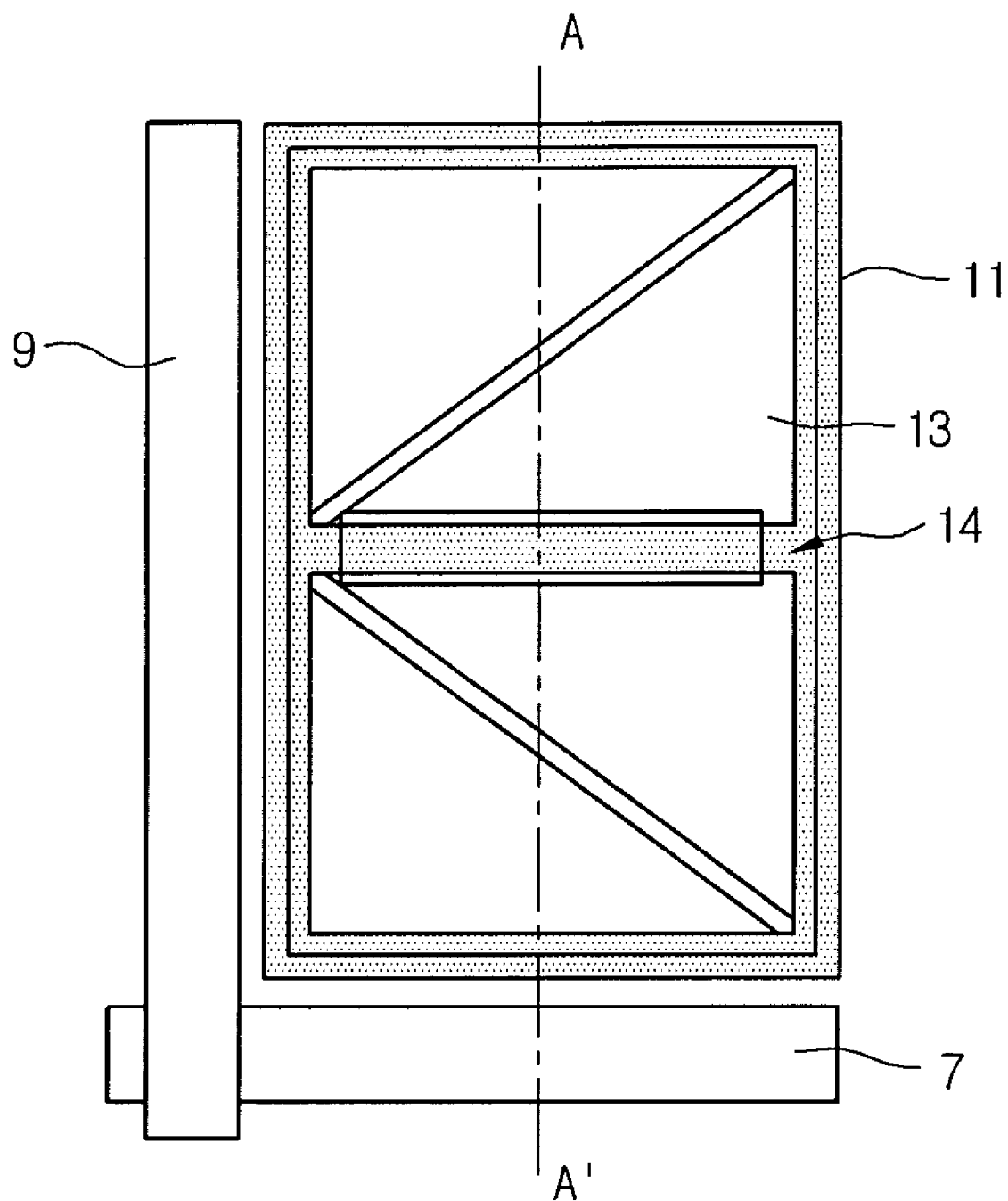
FIG. 1A is a plan view of a pixel unit of a related art LCD.
Figure 1B:
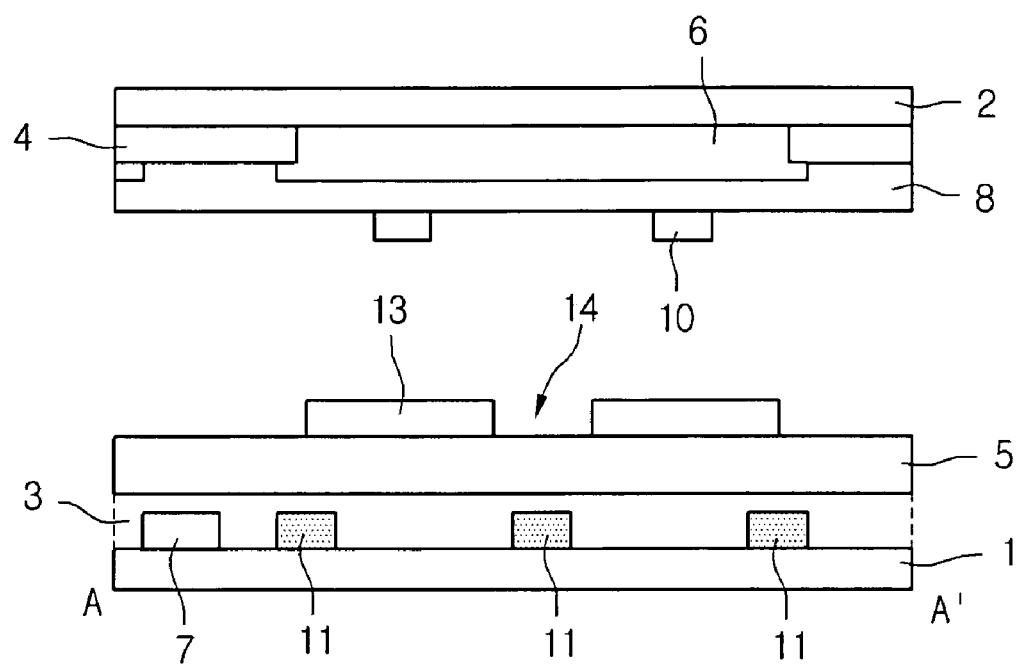
FIG. 1B is a sectional view taken along line A-A' in FIG. 1A.
Figure 2:
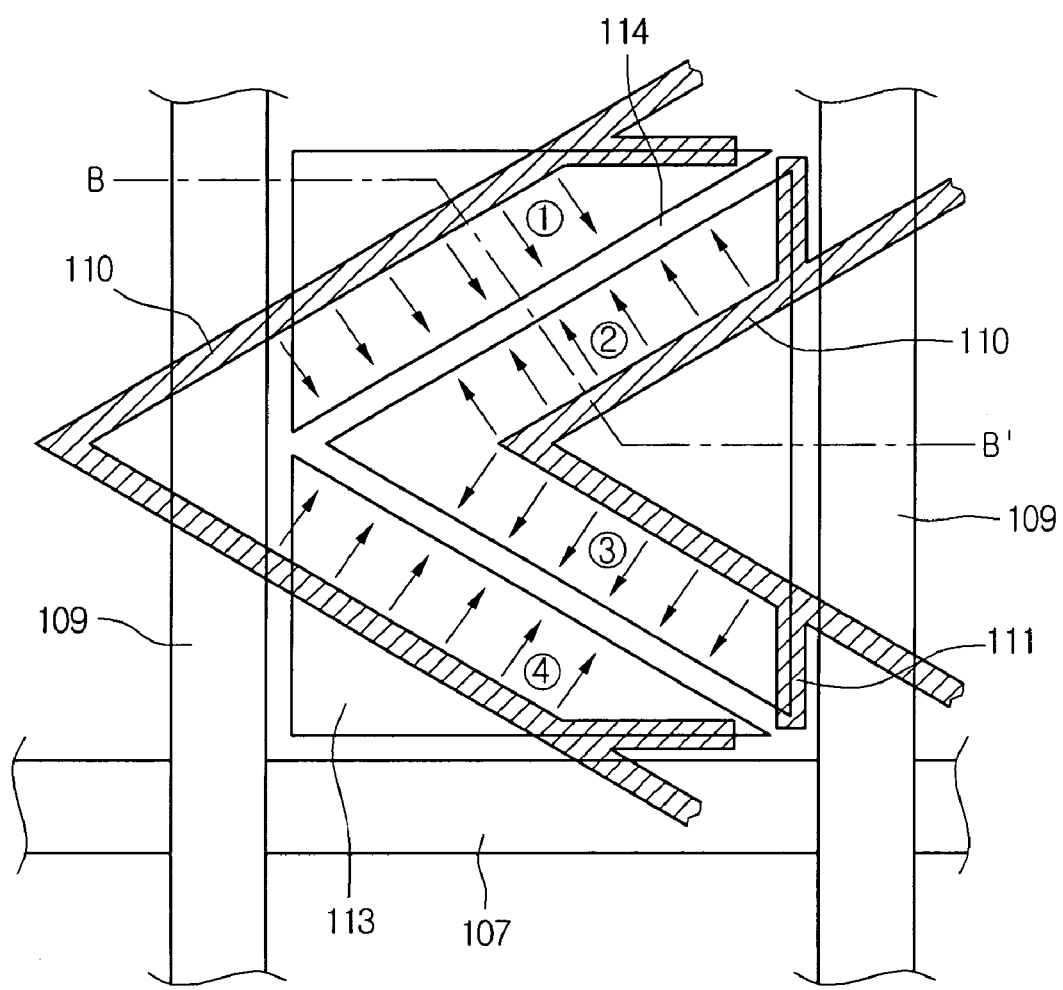
FIG. 2 is a plan view of a multi-domain LCD according to an embodiment of the present invention.
Figure 3:
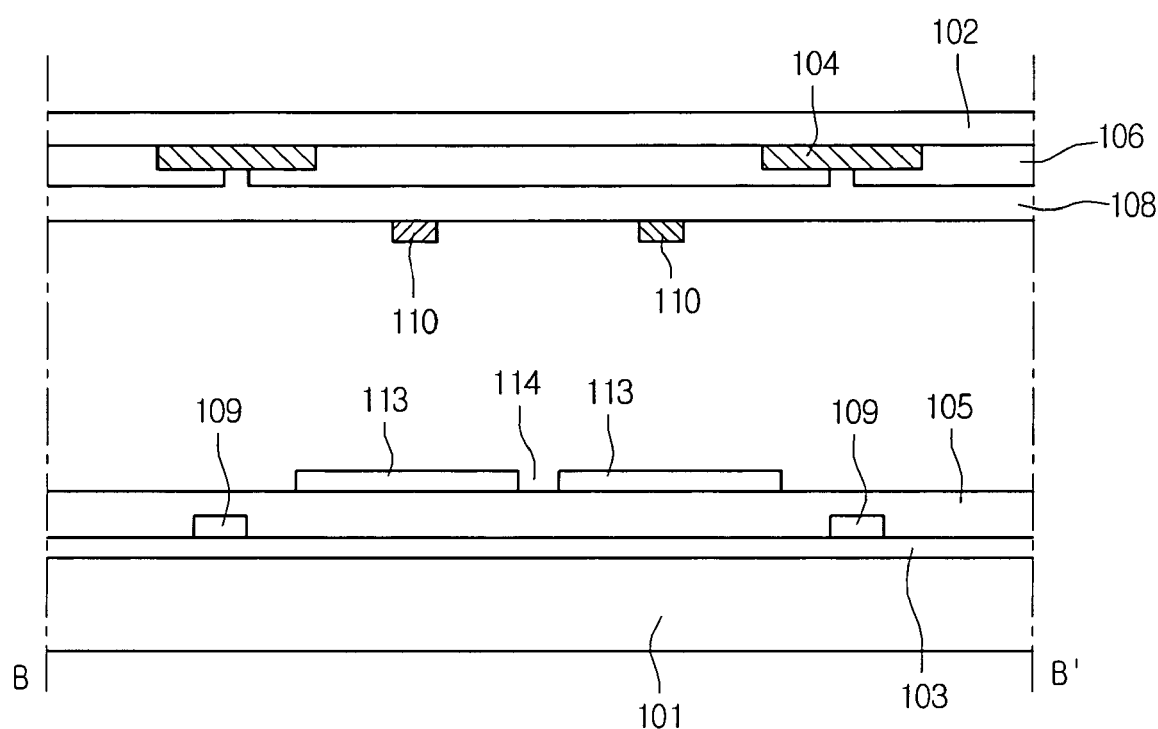
FIG. 3 is a sectional view taken along line B-B' in FIG. 2.

FIG. 2 is a plan view of a multi-domain LCD according to an embodiment of the present invention, and FIG. 3 is a sectional view taken along line B-B' in FIG. 2.

Referring to FIGS. 2 and 3, the multi-domain LCD includes first and second substrates 101 and 102 facing each other, and gate and data lines 107 and 109 intersecting substantially perpendicular to each other on the first substrate 101 to thereby define a pixel region.

A thin film transistor (TFT) is formed at an intersection between the gate line 107 and the data line 109. The TFT includes a gate electrode extended from the gate line 107, a semiconductor layer formed on the gate electrode with a gate insulating layer 103 therebetween, a source electrode extended from the data line 109 to the semiconductor layer, and a drain electrode formed spaced apart from the source electrode by a predetermined distance on the semiconductor layer.

A pixel electrode 113 is formed in the pixel region connected to the drain electrode. A slit pattern 114 is formed in the pixel electrode 113 in the pixel region in such a way to divide the pixel electrode 113 into at least one or more domains, for example, ①②, ③ and ④.

Here, although the pixel electrode 113 is divided into the domains ①, ②, ③ and ④ by the slit pattern 114, the divided domains ①, ②, ③ and ④ are electrically connected to one another to constitute one pixel electrode.

The vertical alignment mode multi-domain LCD may be manufactured using the following method. An isolating layer 103 is formed on the substrate 101, and then the data line 109 is formed on the insulating layer 103. At this time, a passivation layer 105 is formed on the data line 109, and the pixel electrode 113 is formed on the passivation layer 105.

The gate insulating layer 103 and the passivation layer 105 may be made of benzocyclobutene (BCB), acrylic resin, polyamide complex compounds, SiNx, SiOx, or the like.

The pixel electrode 13 may be made of indium tin oxide (ITO), indium zinc oxide (IZO), indium tin zinc oxide (ITZO), or the like.

A black matrix layer 104 is formed on the second substrate 102, and a color filter layer 106 is formed on the black matrix layer 104. A common electrode 108 is formed on the color filter layer 106, and dielectric protrusions 110 are formed on the common electrode 108.

The dielectric protrusions 110 are formed corresponding to the domains □, □, □ and □ and preferably have a dielectric constant identical to or smaller than that of liquid crystal injected into a gap between the first and second substrates 101 and 102.

A liquid crystal layer is formed between the first and second substrates 101 and 102. The liquid crystal is preferably a vertical alignment type liquid crystal containing chiral dopants, and the liquid crystal layer preferably has a negative dielectric anisotropy.

The dielectric protrusion 110 is formed in a zigzag pattern, and the slit pattern 114 is formed in the pixel electrode 113 in a zigzag pattern in parallel to the zigzag dielectric protrusion 110.

Also, an auxiliary pattern 111 is formed extending from the dielectric protrusion 110 near an edge of the domain in the pixel electrode 113. The auxiliary pattern 111 is formed so as to minimize the electric field distortion generated between the pixel electrode 113 and the dielectric protrusion 110.

Although not shown in the drawings, an alignment layer may be formed on the first and/or second substrate(s).

In the resulting multi-domain vertical alignment (MVA) mode LCD, because the distance between the dielectric protrusion 110 and an edge portion of the domain of the pixel electrode 113 becomes relatively uniform in the pixel region, the electric field is uniformly formed, and thus a stable picture texture may be obtained.

Figure 4:
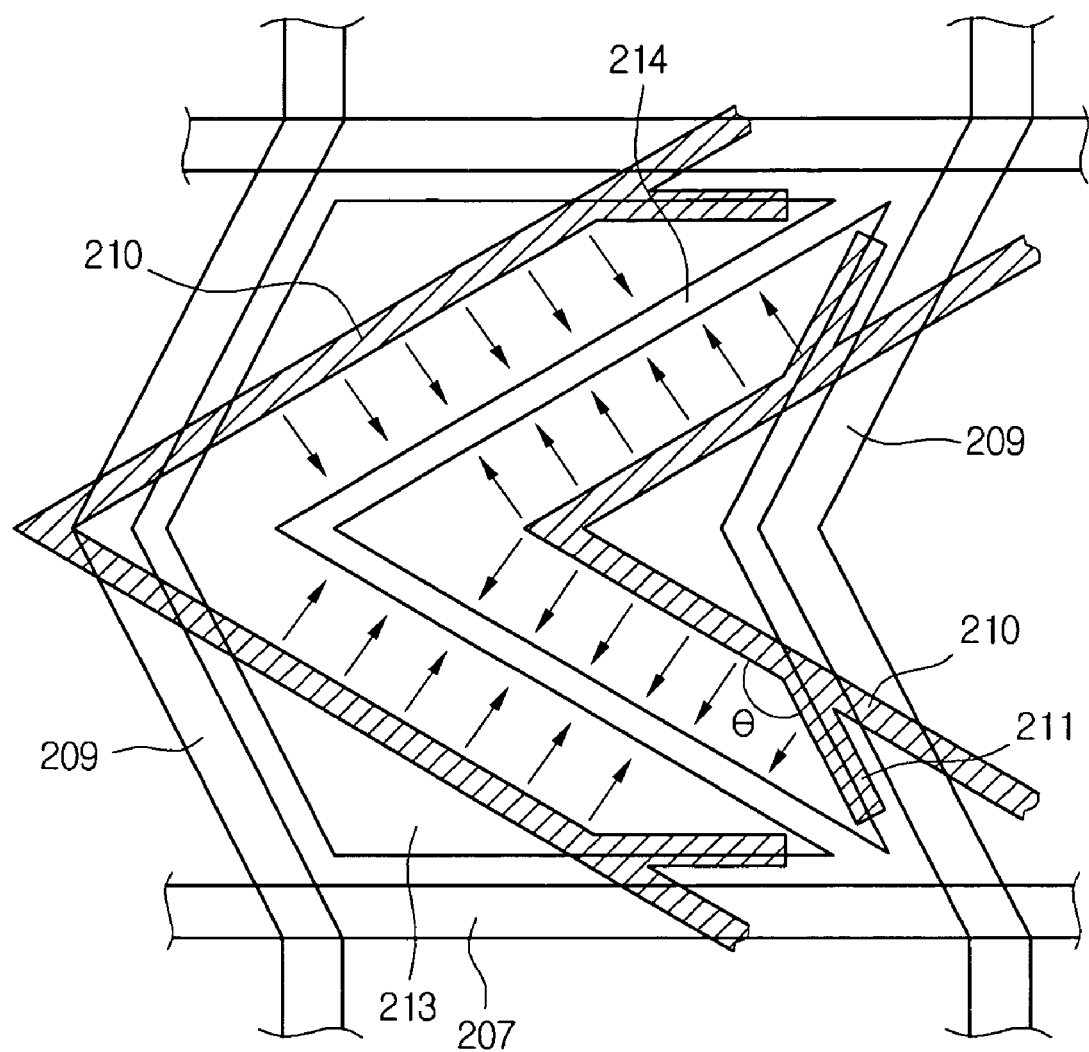
FIG. 4 is a plan view of a multi-domain LCD according to another embodiment of the present invention.
Figure 5:
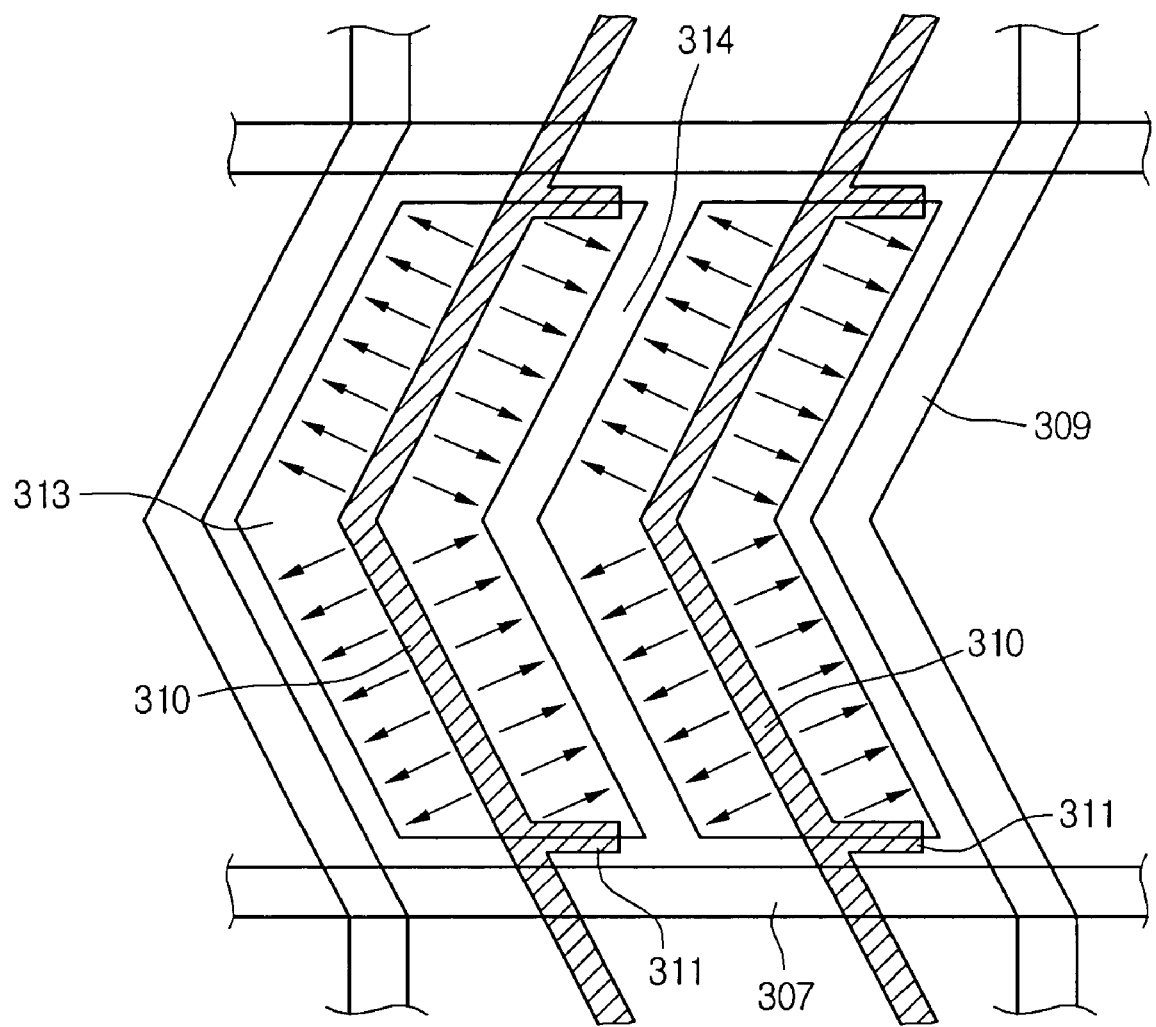
FIG. 5 is a plan view of a multi-domain LCD according to a third embodiment of the present invention.

FIG. 4 is a plan view of a multi-domain LCD according to another embodiment of the present invention, and FIG. 5 is a plan view of a multi-domain LCD according to a third embodiment of the present invention.

A detailed description of the same elements in FIGS. 4 and 5 as found in FIGS. 2 and 3 will be omitted for simplicity.

FIGS. 4 and 5 show a pixel electrode 213 or 313 formed in a pixel region on a first substrate, which is defined by a gate line 207 or 307 and a data line 209 or 309. A slit pattern 214 or 314 is formed in the pixel electrode 213 or 313 in the pixel region in such a way as to divide the pixel electrode 213 or 313 into at least one or more domains.

Although the pixel electrode 213 or 313 is divided into the domains by the slit pattern 214 or 314, the divided domains are electrically connected to one another to thereby constitute one pixel electrode.

The data line 209 or 309 is formed in a zigzag pattern, and the pixel electrode 213 or 313 is also formed in a zigzag pattern.

A passivation layer (not shown) is formed on the data line 209 or 309, and the pixel electrode 213 or 313 is formed on the passivation layer.

Although not shown in FIGS. 4 and 5, but as shown in FIG. 3, a black matrix layer 104 is formed on a second substrate 102 facing the first substrate, and a color filter layer 106 is formed on the black matrix layer 104. A common electrode 108 is formed on the color filter layer 106, and dielectric protrusions 210 or 310 are formed on the common electrode 108.

The dielectric protrusions 210 or 310 are formed corresponding to the respective domains divided by the slit pattern 214 or 314 and preferably has a dielectric constant identical to or smaller than that of liquid crystal injected into a gap between the first and second substrates.

The dielectric protrusion 210 or 310 is formed in a zigzag pattern, and the slit pattern 214 or 314 is formed in the pixel electrode 213 or 313 in a zigzag pattern in parallel to the zigzag dielectric protrusion 210 or 310.

Also, the data line 209 or 309 is formed in a zigzag pattern and an edge of the pixel electrode 213 or 313 is also formed in a zigzag pattern as the zigzag data line 209 or 309.

A liquid crystal layer is formed between the first and second substrates. The liquid crystal is initially aligned vertically when no voltage is applied thereto. The liquid crystal is preferably a vertical alignment type liquid crystal containing chiral dopants, and the liquid crystal layer preferably has a negative dielectric anisotropy.

When a voltage is applied to the liquid crystal, an electric field forms between the pixel electrode 213 or 313 on the first substrate and the common electrode 108 on the second substrate. The electric field is distributed symmetrically with respect to the dielectric protrusion 210 or 310.

When the data line 209 or 309 and the pixel electrode 213 or 313 are formed in a zigzag pattern as described above, a disclination region where an electric field distortion occurs in the electric field distributed between the dielectric protrusion 210 or 310 and the pixel electrode 213 and 313 can be minimized, thereby resulting in a stable alignment of the liquid crystal.

Also, because the distance between the dielectric protrusion 210 or 310 and an edge portion of the domain of the pixel electrode 213 or 313 becomes relatively uniform in the pixel region, an electric field is uniformly formed and thus a stable picture texture can be obtained.

Meanwhile, the slit pattern 314 may have the same zigzag angle as the edge portion of the pixel electrode 313 as illustrated in FIG. 5. Also, the slit pattern 214 may have a different zigzag angle from the edge portion of the pixel electrode 213 as illustrated in FIG. 4.

An auxiliary pattern 211 or 311 is formed at an edge of the domain in the pixel electrode 213 or 313 in such a way to extend from the dielectric protrusion 210 or 310.

The auxiliary pattern 211 or 311 is formed so as to minimize an electric field distortion generated between the pixel electrode 213 or 313 and the dielectric protrusion 210 or 310.

As described above, the present invention can provide an LCD with a wide viewing angle by using a multi-domain structure and forming a slit in the pixel electrode and a dielectric protrusion with a zigzag pattern.

Also, the data line and the pixel electrode are formed in a zigzag pattern to thereby minimize the electric field distortion generated in the electric field distribution between the dielectric protrusion and the pixel electrode. Consequently, the liquid crystal is stably aligned and the picture texture is stable because of effective control of the electric field distortion.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device (LCD) comprising:
   first and second substrates;
   a plurality of gate lines on the first substrate;
   a plurality of data lines crossing the gate lines to define a plurality of pixel regions;
   a thin film transistor at a crossing intersection of the gate line and the data line;
   a pixel electrode in the pixel region, the pixel electrode having a zigzag edge and a zigzag slit pattern formed therein, the slit pattern dividing the pixel electrode into at least two domains;
   a dielectric protrusion on the second substrate; and
   a liquid crystal layer between the first and second substrates,
   wherein the slit pattern has a different zigzag angle from the zigzag edge of the pixel electrode.

2. The LCD according to claim 1, further comprising:
   a black matrix layer on the second substrate;
   a color filter layer on the black matrix layer; and
   a common electrode on the color filter layer.

3. The LCD according to claim 1, wherein the dielectric protrusion is formed in a region of the domain.

4. The LCD according to claim 1, wherein the domains of the pixel electrode are electrically connected to one another.

5. The LCD according to claim 1, wherein the data line is formed in a zigzag pattern.

6. The LCD according to claim 1, wherein the liquid crystal layer has a negative dielectric anisotropy.

7. The LCD according to claim 1, wherein the liquid crystal layer contains chiral dopants.

8. The LCD according to claim 1, wherein the dielectric protrusion has an auxiliary protrusion pattern extending therefrom.

9. The LCD according to claim 1, wherein the dielectric protrusion is parallel to the slit pattern.

10. An LCD (liquid crystal display device) comprising:
    first and second substrates;
    a plurality of gate lines on the first substrate;
    a plurality of zigzag data lines crossing the gate lines to define a plurality of pixel regions;
    a thin film transistor at a crossing of the gate line and the data line;
    a pixel electrode in the pixel region, the pixel electrode having a zigzag edge and a zigzag slit pattern formed therein, the slit pattern dividing the pixel electrode into at least two domains;
    a zigzag dielectric protrusion on the second substrate; and
    a liquid crystal layer between the first and second substrates,
    wherein the slit pattern has a different zigzag angle from the zigzag edge of the pixel electrode.

11. The LCD according to claim 10, further comprising:
    a black matrix layer on the second substrate;
    a color filter layer on the black matrix layer; and
    a common electrode on the color filter layer.

12. The LCD according to claim 10, wherein the dielectric protrusion is formed in a region of the domain.

13. The LCD according to claim 10, wherein the domains of the pixel electrode are electrically connected to one another.

14. The LCD according to claim 10, wherein the liquid crystal layer has a negative dielectric anisotropy.

15. The LCD according to claim 10, wherein the liquid crystal layer contains chiral dopants.

16. The LCD according to claim 10, wherein the dielectric protrusion has an auxiliary protrusion pattern extending therefrom.

17. The LCD according to claim 10, wherein the dielectric protrusion is parallel to the slit pattern.

18. The LCD according to claim 16, wherein the auxiliary protrusion pattern is formed at the edge of the pixel electrode.

19. The LCD according to claim 10, wherein the dielectric protrusion and the auxiliary protrusion pattern have an angle of approximately 135°.

20. A method for manufacturing a liquid crystal display device (LCD), the method comprising:
    providing first and second substrates;
    forming a gate line on the first substrate;
    forming a data line crossing the gate line with an insulating layer therebetween to define a pixel region;
    forming a pixel electrode in the pixel region, the pixel electrode having a zigzag edge and a zigzag slit pattern formed therein, the pixel electrode being divided by the slit into a plurality of domains;
    forming a dielectric protrusion on the second substrate corresponding to the domains, the dielectric protrusion being parallel to the zigzag slit pattern; and
    forming a liquid crystal layer between the first and second substrates,
    wherein the slit pattern has a different zigzag angle from the zigzag edge of the pixel electrode.

21. The method according to claim 20, wherein an auxiliary protrusion pattern is further formed to extend from the dielectric protrusion and to correspond an edge of the pixel electrode.

22. The method according to claim 20, further comprising prior to the forming of the dielectric protrusion:
    forming a black matrix layer on the second substrate;
    forming a color filter layer on the black matrix layer; and
    forming a common electrode on the color filter layer.

23. The method according to claim 20, wherein the data line is formed in a zigzag pattern.

* * * * *